(12) United States Patent
Silverstone

(10) Patent No.: US 10,042,743 B2
(45) Date of Patent: Aug. 7, 2018

(54) COMPUTER SYSTEM TESTING

(71) Applicant: David Silverstone, London (GB)

(72) Inventor: David Silverstone, London (GB)

(73) Assignee: LEFT SHIFT IT LIMITED, London (GB)

( * ) Notice: Subject to any disclaimer, the term of this patent is extended or adjusted under 35 U.S.C. 154(b) by 11 days.

(21) Appl. No.: 15/071,130

(22) Filed: Mar. 15, 2016

(65) Prior Publication Data

US 2016/0283359 A1 Sep. 29, 2016

(30) Foreign Application Priority Data

Mar. 16, 2015 (GB) .................................. 1504373.0

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01); *G06F 11/3676* (2013.01)

(58) Field of Classification Search
CPC .......................... G06F 11/3684; G06F 11/3664
USPC ........ 714/38.1, 37, 36, 4; 717/124, 125, 126
See application file for complete search history.

(56) References Cited

U.S. PATENT DOCUMENTS

| | | | | |
|---|---|---|---|---|
| 8,069,147 | B2* | 11/2011 | Blazejewski | G06F 17/30569 707/640 |
| 2002/0152305 | A1* | 10/2002 | Jackson | H04L 41/0233 709/224 |
| 2006/0010426 | A1* | 1/2006 | Lewis | G06F 11/3684 717/124 |
| 2007/0033578 | A1* | 2/2007 | Arnold | G06F 9/45504 717/130 |
| 2011/0099482 | A1* | 4/2011 | Koved | G06F 21/604 715/741 |
| 2012/0324414 | A1* | 12/2012 | Tzoref-Brill | G01B 31/318371 716/136 |
| 2014/0173349 | A1 | 6/2014 | Farchi et al. | |

OTHER PUBLICATIONS

European Search Report dated Jul. 6, 2016, from European Patent Application No. 16160540.7-1951.

* cited by examiner

*Primary Examiner* — Dieu-Minh Le
(74) *Attorney, Agent, or Firm* — Finnegan, Henderson, Farabow, Garrett & Dunner LLP

(57) ABSTRACT

Computer-implemented methods and apparatuses for application testing are provided. Such apparatuses may include a data repository that stores a copy of at least some of a set of stored reference data. Such apparatuses may also include a test data generation component that generates a set of input data for testing the application. The test data generation component may process a set of received input data and the set of stored reference data according to a data processing operation. The set of received input data and set of stored reference data may each comprise one or more attributes, each with at least one value. The test data generation component may generate the set of input data by selecting at least one value from the copy of the set of stored reference data, and outputting the selected at least one value in the generated set of input data for testing the application.

29 Claims, 3 Drawing Sheets

COMPUTER SYSTEM TESTING

RELATED APPLICATIONS

This application claims the benefit under 35 U.S.C. § 119 of the filing date of British Patent Application No. 1504373.0, filed on Mar. 16, 2015, which is incorporated herein by reference in its entirety to provide continuity of disclosure.

TECHNICAL FIELD

The present disclosure generally relates to computer system testing. More particularly, the present disclosure relates to an apparatus and method for use in testing an application.

BACKGROUND

Testing is an important, but time-consuming, part of software development. Testing processes commonly aim to execute a significant portion of the code of which a software application is composed, in order to determine whether the application operates in the manner in which it was designed to operate. The degree to which an application or computer system is tested is known as the "coverage" of the test. A high coverage indicates that the application has been thoroughly tested. However, most applications are so large and complicated that, in practice, it is impossible for a test to achieve complete coverage. For example, the existence of multiple different execution paths within an application means that it is practically impossible to test each and every line of code, and it is often too time-consuming to achieve a high coverage.

Various tools exist to automate the testing of applications and computer systems. For example, IBM Corporation produces a suite of test tools including IBM® Rational® Performance Test Server and IBM® Rational® Test Workbench, which aim to reduce the time taken to test complex applications by automating much of the testing process.

Automated test tools nevertheless require a significant amount of human involvement. For example, consider an application that is designed to process a message received via a communications network, in which the message contains several attributes or fields, each of which can have a number of possible values. The testing of such an application typically requires a test engineer to construct a large number of test messages containing values that are intended to cause every aspect of the application's functionality to be tested. Constructing such test messages is very time-consuming, and it commonly takes many weeks or months to construct a set of test messages for a typical application. However, even when many person-hours are taken to construct a set of test messages, it has been found that the set of test messages do not achieve a high coverage and/or contain invalid values for attributes in the messages. The presence of invalid values is particularly troublesome, since it may cause "false positive" errors to be detected (e.g. where a correctly-functioning program wrongly appears to contain errors because it has been given invalid data to process) or cause "true positive" errors to be missed (e.g. where an incorrectly-functioning program appears to contain no errors because the invalid data masks the presence of errors).

Thus, there is a need for an improved method for generating data for use in testing applications and computer systems.

SUMMARY

An apparatus for use in testing an application is disclosed herein. The application is operable to perform a data processing operation by processing a set of received input data and a set of stored reference data, the set of input data and set of reference data each comprising one or more attributes, the attributes each having at least one value. The apparatus comprises: a data repository configured to store a copy of some or all of the set of stored reference data; and a test data generation component configured to generate a set of input data for use in testing the application by selecting at least one value from the copy of the set of stored reference data, and outputting the selected value in the generated set of input data. Generating a set of input data in this manner helps to ensure that the application is tested using valid data. This is because referential integrity exists between the generated set of input data and the set of stored reference data, by virtue of the fact that at least one value of the input data has been selected from a copy of the reference data that is stored by the application itself. Thus, the computer system can be tested without the risk that a lack of referential integrity between the input data and the reference data might cause false positive errors to be detected or true positive errors to remain undetected. As used herein, the term "referential integrity" means that if one entity references another, then that other entity actually exists.

The term "reference data" as used herein is not intended to imply that that data has a particular content. Rather, the term reference data is used merely to distinguish that data from the input data. However, from the point of view of the application, the reference data has a different function from the input data. This is because the application receives the input data for a specific data processing operation, whereas the reference data is stored by the application for use in any number of data processing operations.

The data repository may be further configured to designate one or more attributes of the input data and/or reference data as being attributes whose values determine the data processing operation that is performed by the application, and identify a plurality of values or ranges of values of the designated attributes that result in different data processing operations being performed by the application. The test data generation component may be further configured to generate the set of input data by selecting a plurality of values for the designated attributes, based upon the identified plurality of values or ranges of values, that result in different data processing operations being performed by the application during testing. Generating input data in this manner improves test coverage, by testing the different data processing operations that can be performed by the application. If the input data were to be generated without regard to the specific values or ranges of values that result in different data processing operations being performed, then the same data processing operations may be tested multiple times unnecessarily, whilst other data processing operations may not be tested at all.

The test data generation component may be configured to select the plurality of values for the designated attributes by selecting values that cause each of the different data processing operations that can be performed by the application to be performed only once during testing. For example, the test data generation component may configured to select the plurality of values for the designated attributes by: generating a plurality of vectors, each vector comprising a plurality of values for a respective one of the designated attributes, wherein each value of each vector is selected from the identified plurality of values or ranges of values for the respective one of the designated attributes; and calculating the Cartesian product of the plurality of vectors to generate a plurality of combinations of values of the designated attributes. By calculating a Cartesian product in this manner, several combinations of values of the designated attributes are generated, wherein each combination of values causes the application to perform a different data processing operation. Moreover, the Cartesian product calculation generates values for attributes of the input data that cause each of the different data processing operations that can be performed by the application to be performed only once during testing. This results in maximum test coverage being achieved with a minimum number of tests.

The data repository may be further configured to store logic defining valid combinations of values for a plurality of attributes, and the test data generation component may be further configured to disregard combinations of values that do not satisfy the stored logic defining valid combinations of values. Generating input data in this manner improves the efficiency of testing, by avoiding testing being performed using input data that contains invalid combinations of attribute values. Furthermore, generating input data in this manner also avoids false positive errors being detected due to invalid combinations of attribute values.

The copy of the set of stored reference data may comprise a plurality of records, wherein each record comprises a plurality of related values, and wherein each value is the value of an attribute of the set of stored reference data. The test data generation component may be further configured to generate the set of input data by selecting a plurality of records from the copy of the set of stored reference data, wherein the selected plurality of records comprise the selected plurality of values for the designated attributes, and outputting the plurality of related values from the selected plurality of records in the generated set of input data. Generating the set of input data in this manner helps to ensure that the application is tested using valid data. Some of the values that need to be included in the input data can be found by selecting records from the copy of the reference data that comprise the desired values of the designated attributes, and obtaining the values that are needed from those records. This helps ensures that referential integrity exists between the generated set of input data and the set of stored reference data.

The data repository may be further configured to store logic defining the value of an attribute of the input data that is not contained in the copy of the set of stored reference data. The test data generation component may be further configured to use the stored logic to generate a value for an attribute of the input data that is not contained in the copy of the set of stored reference data, and output the generated value in the generated set of input data.

The data repository may be further configured to store logic defining a relationship between a set of output data generated by the application when performing a data processing operation and the values of the attributes of the reference data and/or input data processed by that data processing operation, wherein the output data comprises one or more attributes each having at least one value. The test data generation component may be further configured to use the stored logic to generate a set of output data for use in testing the application, by generating a value for an attribute of the generated set of output data that satisfies the relationship with the reference data in the copy of the set of stored reference data and the generated input data. Generating output data in this manner allows testing to be automated. The output data generated by the test data generation component represents the output that the application is expected to generate for a given set of reference data and input data, and so can be automatically compared with the output data that the application actually generates when tested. A difference between the output data generated by the test data generation component and the output data that the application actually generated suggests that an error is present in the application.

The apparatus may further comprise a reference data extraction component configured to: select a subset of the stored reference data used by the application; extract the selected subset of the reference data from the stored reference data used by the application; and store the extracted subset of the reference data in the data repository. The reference data extraction component avoids the need to generate reference data specifically for the purpose of testing, by allowing reference data that is already present in the computer system to be imported into the apparatus.

The apparatus may further comprise a reference data export component configured to export the copy of the set of stored reference data from the data repository to a test environment. The reference data export component can thereby populate the test environment with reference data that is valid for use with the test data generated by the test data generation component.

The data repository may be configured to store a plurality of versions of the data stored therein, wherein each version comprises a copy of some or all of the set of stored reference data at a respective time. The test data generation component may be further configured to select a version of the data stored in the data repository, and generate a set of input data and/or output data corresponding to the selected version of the data. The data repository thus stores a number of 'snapshots' of the reference data stored by the application at different points in time, and the test data generation component can generate valid data for use in testing the application at any of those points in time. The apparatus may further comprise a reference data export component configured to export a selected version of the reference data stored in the data repository to a test environment. The reference data export component populates the test environment with reference data that is valid for use with the test data generated by the test data generation component.

The test environment may comprise a virtual service configured to simulate the functionality of the application. The reference data export component provides the virtual service with reference data that is valid for use with the test data generated by the test data generation component. This allows the functionality of the application to be simulated more accurately, thus allowing the tests to reflect more accurately the behaviour of the application.

The apparatus may be configured for use in testing a computer system comprising the application and one or more further applications, the one or more further applications each being operable to perform a respective data processing operation by processing a respective set of received input data and a respective set of stored reference data. The data repository may be configured to store a copy of some or all of the sets of stored reference data for the one or more further applications. The test data generation component may be configured to generate a set of input data for use in testing the one or more further applications by selecting at least one value from the copy of the set of stored reference data for the one or more further applications, and outputting the selected value in the generated set of input data. The input data that is generated in this manner has referential integrity with each of the respective sets of stored reference data that are used by each application, by virtue of the fact that at least one value of the input data has been selected from a copy of each application's reference data.

The apparatus can thus be used for integration testing. That is, the apparatus can be used to test the interoperation between a plurality of applications.

Also disclosed herein is a computer-implemented method of generating data for use in testing an application, the application being operable to perform a data processing operation by processing a set of received input data and a set of stored reference data, the set of input data and set of reference data each comprising one or more attributes, the attributes each having at least one value, the method comprising: selecting at least one value from a data repository comprising a copy of some or all of the set of stored reference data; and generating a set of input data for use in testing the application by outputting the selected value.

The method may further comprise loading stored logic that designates one or more attributes of the input data and/or reference data as being attributes whose values determine the data processing operation that is performed by the application, and identifies a plurality of values or ranges of values of the designated attributes that result in different data processing operations being performed by the application. Generating the set of input data may further comprise selecting a plurality of values for the designated attributes, based upon the identified plurality of values or ranges of values, that result in different data processing operations being performed by the application during testing. Selecting the plurality of values for the designated attributes may comprise selecting values that cause each of the different data processing operations that can be performed by the application to be performed only once during testing. Selecting the plurality of values for the designated attributes may further comprise: generating a plurality of vectors, each vector comprising a plurality of values for a respective one of the designated attributes, wherein each value of each vector is selected from the identified plurality of values or ranges of values for the respective one of the designated attributes; and calculating the Cartesian product of the plurality of vectors to generate a plurality of combinations of values of the designated attributes. The method may further comprise loading stored logic that defines valid combinations of values for a plurality of attributes, wherein selecting the plurality of values for the designated attributes further comprises disregarding combinations of values that do not satisfy the stored logic defining valid combinations of values.

The copy of the set of stored reference data may comprise a plurality of records, each record comprising a plurality of related values, each value being the value of an attribute of the set of stored reference data. Generating the set of input data may further comprise: selecting a plurality of records from the copy of the set of stored reference data, wherein the selected plurality of records comprise the selected plurality of values for the designated attributes; and outputting the plurality of related values from the selected plurality of records in the generated set of input data. The method may further comprise loading stored logic that defines the value of an attribute of the input data that is not contained in the copy of the set of stored reference data; using the stored logic to generate a value for an attribute of the input data that is not contained in the copy of the set of stored reference data, and outputting the generated value in the generated set of input data. The method may further comprise: loading stored logic that defines a relationship between a set of output data generated by the application when performing a data processing operation and the values of the attributes of the reference data and/or input data processed by that data processing operation, the output data comprising one or more attributes each having at least one value; and using the stored logic to generate a set of output data for use in testing the application, by generating a value for an attribute of the generated set of output data that satisfies the relationship with the reference data in the copy of the set of stored reference data and the generated input data.

The method may further comprise: selecting a subset of the stored reference data used by the application; extracting the selected subset of the reference data from the stored reference data used by the application; and storing the extracted subset of the reference data in the data repository. The method may further comprise exporting the copy of the set of stored reference data from the data repository to a test environment.

The data repository may store a plurality of versions of the data stored therein, each version comprising a copy of some or all of the set of stored reference data at a respective time, and the method may further comprise: selecting a version of the data stored in the data repository; and generating a set of input data and/or output data corresponding to the selected version of the data. The method may further comprise exporting the selected version of the reference data stored in the data repository to a test environment. The test environment may comprise a virtual service configured to simulate the functionality of the application.

The method may be used for generating a set of input data for use in testing a computer system comprising the application and one or more further applications. The one or more further applications are each operable to perform a respective data processing operation by processing a respective set of received input data and a respective set of stored reference data. In this case, the method further comprises: selecting at least one value from a copy of some or all of the sets of stored reference data for the one or more further applications that is stored in the data repository; and outputting the selected value in the generated set of input data.

An apparatus and method for generating a coverage matrix can be provided independently. Disclosed herein is an apparatus for use in testing an application, the application being operable to perform a data processing operation by processing a set of received input data and a set of stored reference data, the set of input data and set of reference data each comprising one or more attributes, the attributes each having at least one value. The apparatus comprises a data repository configured to designate one or more attributes of the input data and/or reference data as being attributes whose values determine the data processing operation that is performed by the application, and identify a plurality of values or ranges of values of the designated attributes that result in different data processing operations being performed by the application. The apparatus further comprises a test data generation component configured to generate a set of input data for use in testing the application by selecting a plurality of values for the designated attributes, based upon the identified plurality of values or ranges of values, that result in different data processing operations being performed by the application during testing, and outputting the selected plurality of values for the designated attributes in the generated set of input data. The test data generation component may optionally be configured to select the plurality of values for the designated attributes by generating a plurality of vectors, each vector comprising a plurality of values for a respective one of the designated attributes, wherein each value of each vector is selected from the identified plurality of values or ranges of values for the respective one of the designated attributes; and calculating the Cartesian product of the plurality of vectors to generate a plurality of combinations of values of the designated attributes. The data repository may optionally be further configured to store logic defining valid combinations of values for a plurality of attributes; and the test data generation component may optionally be further configured to disregard combinations of values that do not satisfy the stored logic defining valid combinations of values.

Also disclosed herein is a method of generating data for use in testing an application, the application being operable to perform a data processing operation by processing a set of received input data and a set of stored reference data, the set of input data and set of reference data each comprising one or more attributes, the attributes each having at least one value. The method comprises loading stored logic that: designates one or more attributes of the input data and/or reference data as being attributes whose values determine the data processing operation that is performed by the application; and identifies a plurality of values or ranges of values of the designated attributes that result in different data processing operations being performed by the application. The method further comprises generating a set of input data for use in testing the application by: selecting a plurality of values for the designated attributes, based upon the identified plurality of values or ranges of values, that result in different data processing operations being performed by the application during testing; and outputting the selected plurality of values for the designated attributes in the generated set of Input data. The method may optionally further comprise selecting the plurality of values for the designated attributes by generating a plurality of vectors, each vector comprising a plurality of values for a respective one of the designated attributes, wherein each value of each vector is selected from the identified plurality of values or ranges of values for the respective one of the designated attributes; and calculating the Cartesian product of the plurality of vectors to generate a plurality of combinations of values of the designated attributes. The method may optionally further comprise: loading stored logic defining valid combinations of values for a plurality of attributes; and disregarding combinations of values that do not satisfy the stored logic defining valid combinations of values.

Also disclosed herein is a processor-readable medium comprising instructions which, when executed by a processor, cause the processor to perform any of the methods disclosed herein.

BRIEF DESCRIPTION OF THE DRAWINGS

Embodiments will now be described, purely by way of example, with reference to the accompanying drawings, wherein like elements are indicated using like reference signs, and in which.

DETAILED DESCRIPTION

Figure 1:
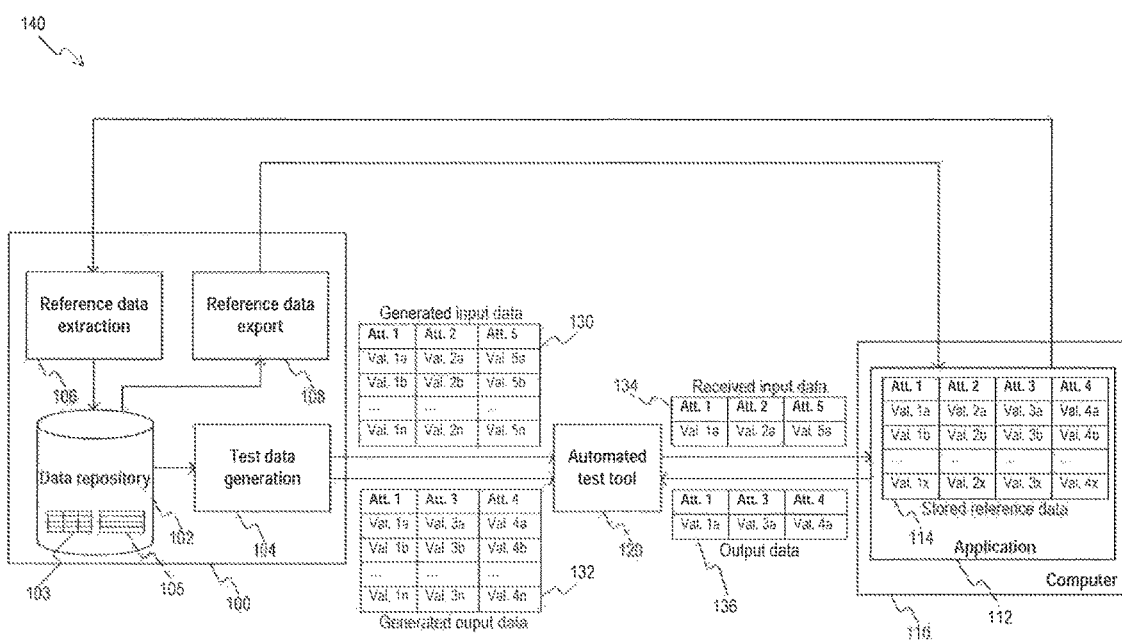
FIG. 1 is a schematic diagram of a computer system configured to test a single application.

FIG. 1 illustrates a computer system 140 that comprises a computer 110, an apparatus 100 for use in testing an application 112 that is executed by the computer 110, and an automated test tool 120.

The computer 110, apparatus 100 and automated test tool 120 are linked to each other by a communications network (not shown), such that they can communicate via the network. The network may comprise any suitable wired or wireless communication technology, or any combination of different wired and/or wireless communication technologies. For example, the network may comprise a short-range wireless communication link, such as a Bluetooth™ or IEEE 802.11 (WiFi™) link. As another example, the network may comprise a local area network (LAN), such as a wired network based upon Ethernet communication technologies. As yet another example, the network may comprise a wide area network (WAN), such as the Internet or a cellular telephone network.

The computer 110 comprises a processor and memory (not shown in FIG. 1). The processor of the computer 110 executes an application 112 that is stored in the memory. When executed, the application 112 performs a data processing operation by processing a set of received input data 134 and a set of stored reference data 114. The application 112 receives the input data 134 via the communications network. For example, the input data 134 may be included in a message that is communicated via the communications network. The reference data 114 can be stored in any location from which it can be accessed by the application 112. For example, the reference data 114 may be stored in the memory of the computer 110, in a database hosted by the computer 110 or another computer (not shown), or in any other suitable location. The data processing operation causes the application to generate a set of output data 136. The present disclosure can be applied to a wide range of applications and, therefore, the functionality of the application 112 and the content of the data 134, 114, 136 need not be explained in detail.

The input data 134, reference data 114 and output data 136 each comprise one or more attributes, which are denoted in FIG. 1 as Att. 1, Att. 2, Att. 3, etc. Each attribute of the input data 134, reference data 114 and output data 136 comprises at least one value. For example, the values of a first attribute, Att. 1, are denoted in FIG. 1 as Val. 1$a$, Val. 1$b$ . . . Val. 1$x$. Whilst FIG. 1 illustrates the input data 134, reference data 114 and output data 136 in the form of tables, they can exist in any suitable format, including non-tabular formats.

The application 112 may be capable of performing a plurality of different data processing operations. The particular data processing operation that is performed by the application 112 may be determined by the values of one or more of the attributes of the input data 134. This can occur when different values of a single attribute, or different combinations of values of several attributes, cause different execution paths to be taken through the application 112. For example, one execution path may be performed if the second attribute, Att. 2, of the received input data 134 has a value greater than zero, whilst a different execution path may be performed if that attribute has a value less than zero. Alternatively or additionally, the particular data processing operation that is performed by the application 112 may be determined by the values of one or more of the attributes of the reference data 114. For example, one execution path may be performed if the third attribute, Att. 3, of the reference data 114 has a particular value, whilst a different execution path may be performed if that attribute has any other value.

The apparatus 100 comprises a data repository 102 and a test data generation component 104. The apparatus 100 may optionally further comprise a reference data extraction component 106 and a reference data export component 108.

The test data generation component 104 is capable of generating data for use in testing the application 112. The data generated by the test data generation component 104 includes input data 130 and/or output data 132. The input data 130 and output data 132 each comprise one or more attributes, where each attribute comprises at least one value. The method by which the input data 130 and output data 132 are generated is discussed below, in connection with FIG. 2. The test data generation component 104 is configured to provide the generated input data 130 and the generated output data 132 to the automated test tool 120.

The data repository 102 is configured to store data and logic 105 that is used by the test data generation component 104 to generate data for use in testing the application 112. The data stored by the data repository includes a copy 103 of some or all of the set of stored reference data 114. Whilst it is possible for the data repository 102 to a store a complete copy of the stored reference data 114, a complete copy is not always needed to generate test data. Thus, the storage requirements of the apparatus 100 can be reduced by storing only a subset of the reference data 114 in the data repository 102. For example, certain attributes of the original reference data 114 may be omitted from the copy of the reference data 103. Alternatively or additionally, the copy of the reference data 103 may comprise only a sample of the values of the original reference data 114.

The copy of the reference data 103 may be stored as a plurality of records, where each record comprises a plurality of related values, and where each value is the value of a different attribute of the original reference data 114. Thus, the values in a record are related in the sense that they are the values of the attributes of a single entity. For example, a row in a table of a relational database can be considered to be a record. However, the data repository 102 can comprise any suitable means for storing data, and need not comprise a relational database. For example, the data repository 102 can comprise a NoSQL database, such as MongoDB or Apache Cassandra. The data repository 102 can also comprise a combination of different means for storing data. For example, the data repository 102 may comprise a combination of a non-volatile storage device (such as a hard disk drive) and a volatile storage device (such as a random access memory).

The data repository 102 may store a plurality of versions of the data stored therein. Each version of the data stored in the data repository 102 comprises a copy 103 of some or all of the set of stored reference data 114 at a different point in time. The test data generation component 104 can select any of the versions of the data stored in the data repository 102, and generate a set of input data 130 and/or a set of output data 132 that corresponds to the selected version of the data. Furthermore, the reference data export component 108 (described below) can select any of the versions of the data stored in the data repository 102, and export the copy of the reference data 103 of the selected version to a test environment. The provision of different versions of the data allows different versions of the application 112 to be tested with data that is valid for that particular version of the application 112.

The logic 105 stored by the data repository 102 includes logic for defining the content of the input data 130, 134 that is generated by the test data generation component 104. More specifically, the data repository 102 may be configured to store logic that defines the attributes that need to be included in the input data 130, 134 for testing the application 112. This helps to ensure that valid input data 134 is provided to the application 112 during testing. The logic for defining the content of the input data 130, 134 designates one or more attributes of the input data 130, 134 and/or one or more attributes of the reference data 114 as being attributes whose values determine the data processing operation that is performed by the application 112, and identifies a plurality of values or ranges of values of the designated attributes that result in different data processing operations being performed by the application 112. As explained above, different values of certain attributes, or different combinations of values of certain attributes, can cause different execution paths to be taken through the application 112. Thus, the logic stored in the data repository describes which attributes, and which values of those attributes, influence the execution path that is taken. The knowledge of which attributes influence the execution path, which is embodied in the logic, can be used to provide a high level of test coverage, by allowing tests to be automatically defined that test each execution path.

The logic 105 stored by the data repository 102 also includes logic that defines valid combinations of values for a plurality of attributes of the input data 130, 134 and/or reference data 114. This logic also helps to ensure that valid input data 134 is provided to the application 112 during testing, by avoiding the test data generation component 104 generating invalid input data 130.

The logic 105 stored by the data repository 102 also includes logic that defines the values of one or more attributes of the input data 130, 134 that are not contained in the copy of the reference data 103. By way of explanation, the input data 130, 134 may comprise values for certain attributes that are also present in the reference data 114 that is stored for use by the application 112 and, consequently, the values of those attributes are also present in the copy of the reference data 103 that is stored in the data repository 102. The input data 130, 134 comprises values for those attributes so that the application 112 can identify particular entries in the reference data 114 that comprise attributes having those values. However, the input data 130, 134 may also comprise values for certain attributes that are not present in the reference data 114 that is stored for use by the application 112 and, therefore, are not present in the copy of the reference data 103. Whilst the latter values are not used by the application 112 to identify particular entries in the reference data 114, they are nevertheless used in the data processing operation that is performed by the application and, therefore, need to be valid. Thus, the data repository 102 stores logic that allows the data generation component 104 to generate valid values for any attributes of the input data 130, 134 that are not contained in the copy of the reference data 114. For example, the logic may specify that the value of a particular attribute of the input data 130, 134 should be within a certain numerical range. As another example, the logic may specify that the value of a particular attribute of the input data 130, 134 should have a value selected from a list of permitted values. As yet another example, the logic may specify that the value of a particular attribute of the input data 130, 134 is a mathematical function of one or more other values of the input data 130, 134 and/or one or more values of the reference data 114.

The logic 105 stored by the data repository 102 also includes logic for defining the content of output data 132 that is generated by the test data generation component 104. More specifically, this logic describes each value of the attributes of the output data 132 as a function of the values of the attributes of the input data 130, 134 and/or reference data 114. The output data 132 that is generated by the test data generation component 104 represents the output data 136 that the application 112 is expected to generate for a given set of reference data 114 and input data 134. Thus, the logic allows the data generation component 104 to generate output data 132 that corresponds to the input data 130 that is generated by the data generation component 104. The output data 132 that is generated by the test data generation component 104 can be compared, by the automated test tool 120, with the output data 136 that the application 112 actually generates when tested. Errors in the application 112 can thus be automatically identified.

The logic 105 in the data repository 102 can be provided by a data architect, systems analyst, computer programmer or some other person with knowledge of how the application 112 operates. For example, the apparatus 100 may comprise a graphical user interface (not shown in FIG. 1) to allow a person to input logic 105 into the data repository 105.

The reference data extraction component 106 is configured to provide a copy of the reference data 114 to the data repository 102. For example, the reference data extraction component 106 may query a database (not shown) in which the reference data 114 is stored for use by the application 112, so as to retrieve some or all of the reference data 114. The reference data extraction component 106 may then store the retrieved reference data 114 in the data repository. As explained above, the copy of the reference data 103 that is stored in the data repository 102 may be only a subset of the reference data 114 that is stored for use by the application 112 itself. In this case, the reference data extraction component 106 can select a subset of the reference data 114 that is stored for use by the application 112, extract the selected subset of the reference data 114 from the reference data used by the application 112 (e.g. by querying a database), and store the extracted subset of the reference data 114 in the data repository 102.

The reference data export component 108 is configured to provide the copy of the reference data 103 from the data repository 102 to a test environment. For example, the test environment may include the application 112 and, in this case, the reference data export component 108 is configured to provide the copy of the reference data 103 to the application 112 itself. This functionality allows known reference data 114 to be proved to the application 112 before testing, so as to allow each test to be repeatable. This is particularly useful when a data processing operation performed by the application 112 causes the reference data 114 to be modified, which might prevent the tests from being repeated. As another example, the test environment may include a virtual service that is configured to simulate the functionality of the application 112. In this example, the reference data export component 108 is configured to provide the copy of the reference data 103 to the virtual service, thus ensuring that the virtual service has reference data that is valid for use with the test data generated by the test data generation component. An example of a suitable virtual service to which the reference data export component 108 may provide the copy of the reference data 103 is a virtual service implemented using IBM® Rational® Test Virtualization Server.

The automated test tool 120 is configured to receive the input data 130 that is generated by the test data generation component 104, and to provide input data 134 to a test environment. As explained in the previous paragraph, the test environment may include the application 112 itself or a virtual service that is configured to simulate the functionality of the application 112. The automated test tool 120 is also configured to receive the output data 132 that is generated by the test data generation component 104, and to receive output data 136 from the test environment. The automated test tool 120 can compare the output data 132 generated by the test data generation component 104 with the output data 136 received from the test environment. If all of the values of the attributes of the output data 132 and output data 136 are identical, then the application 112 is assumed to be functioning correctly. However, any differences between the values of the attributes of the output data 132 and output data 136 may indicate the presence of an error in the application 112. Purely as a non-limiting example, the automated test tool 120 may be IBM® Rational® Test Workbench.

Figure 2:
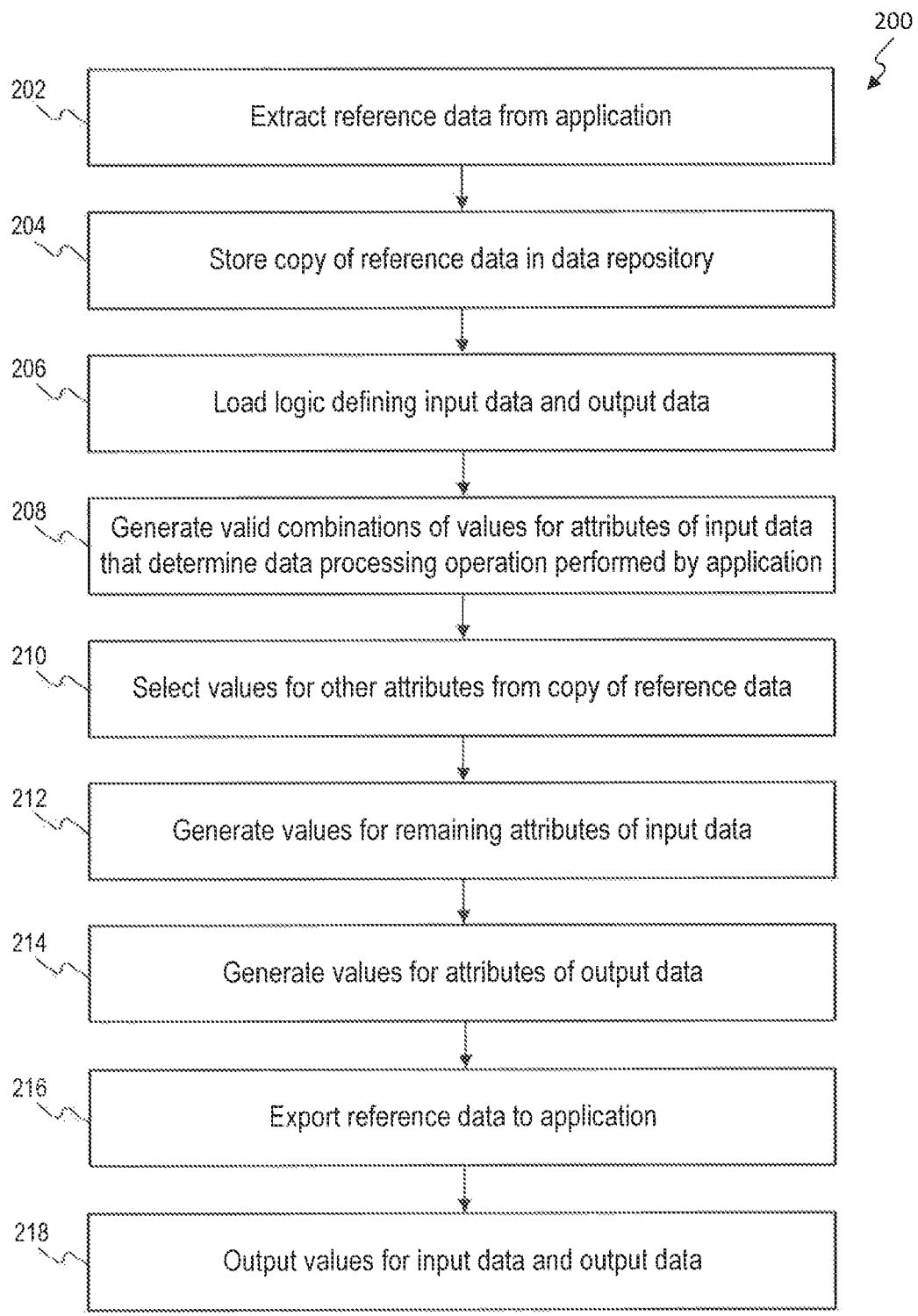
FIG. 2 is a flow diagram of a method of generating data for use in testing an application.

An example of a method 200 of generating data for use in testing an application 112 will now be described with reference to FIG. 2.

At step 202, the reference data extraction component 106 extracts reference data 114 from the application 112. As explained above, this can be achieved by querying a database in which the reference data 114 is stored for use by the application 112. However, if the reference data 114 is not stored in a database or if the database cannot be queried by the reference data extraction component 106, then the reference data 114 can be extracted in any other suitable way. For example, the reference data extraction component 106 may read the reference data 114 directly from a storage device on which it is stored.

At step 204, the reference data extraction component 106 stores a copy 103 of the reference data 114 that was extracted from the application 112 in the data repository 102. Steps 202 and 204 need not be performed if the data repository 102 already contains a copy of the reference data 103.

At step 206, the test data generation component 104 loads, from the data repository 102, logic 105 defining the content of input data 130 and output data 132 that is to be generated. More specifically, at step 206, the test data generation component 104 can load logic that designates one or more attributes of the input data 130, 134 and/or one or more attributes of the reference data 114 as being attributes whose values determine the data processing operation that is performed by the application 112, and that identifies a plurality of values or ranges of values of the designated attributes that result in different data processing operations being performed by the application 112. The test data generation component 104 can load logic that defines valid combinations of values for a plurality of attributes of the input data 130, 134 and/or reference data 114. The test data generation component 104 can load logic that defines values of one or more attributes of the input data 130, 134 that are not contained in the copy of the reference data. The test data generation component 104 can load logic that describes each value of the attributes of the output data 132 as a function of the values of the attributes of the input data 130, 134 and/or reference data 114.

At step 208, the test data generation component 104 generates valid combinations of values of the attributes that are designated, by the logic loaded at step 206, as being attributes whose values determine the data processing operation that is performed by the application 112. This may involve generating a plurality of vectors, each of which comprises a plurality of values for each of the designated attributes. Each value in each vector is selected from the values, or ranges of values, that are identified in the logic as being values that cause different data processing operations to be performed. The Cartesian product of the vectors is then calculated to generate a matrix (referred to herein as a coverage matrix) comprising several combinations of values of the designated attributes. Each combination of values in the coverage matrix causes the application 112 to perform a different data processing operation. To ensure that only valid combinations are generated, the test data generation component 104 disregards any combinations of values that are invalid. For example, the test generation component 106 may evaluate the logic defining valid combinations of values (that was loaded at step 206) whilst calculating the Cartesian product, such that only combinations of values that satisfy the stored logic are stored in the coverage matrix, without storing combinations of values that do not satisfy the stored logic. As another example, the test generation component may modify the coverage matrix that was generated by calculating the Cartesian product, so as to discard combinations of values that do not satisfy the logic defining valid combinations, whilst retaining combinations of values that satisfy the stored logic. When invalid combinations of values have been disregarded, the values in the coverage matrix define a plurality of tests that cause each of the different data processing operations that can be performed by the application to be performed only once during testing.

The coverage matrix generated at step 208 contains values for all attributes of the input data 130, 134 whose values determine the data processing operation that is performed by the application 112. However, the coverage matrix does not necessarily contain values for every attribute of the input data 130, 134. One situation in which this may occur is when the coverage matrix defines tests that require certain attributes of the reference data to have particular values, but wherein those attributes are not part of a valid input data message; the values for these attributes are optionally generated at step 210. Another situation in which this may occur is when certain attributes of the input data 130, 134 do not influence the coverage of the tests, but must nevertheless have valid values; the values for these attributes are optionally generated at step 212.

At step 210, the test data generation component 104 searches the copy of the reference data 103 to locate records having attribute values that are equal to the values in the coverage matrix. The test data generation component 104 then reads the values of any attributes whose values were not generated at step 208, but which are needed to form valid input data 134, from the located records. The data generation component 104 can add those values to the coverage matrix.

At step 212, the test data generation component 104 generates values for any remaining attributes that are needed to form valid input data 130, 134, but which were not generated at steps 208 and 210. This may involve using the logic that defines values of one or more attributes of the input data 130, 134 that are not contained in the copy of the reference data, which was loaded at step 206.

At step 214, the test data generation component 104 generates values for attributes of the output data 132. This may involve using the logic that was loaded at step 206.

At step 216, the reference data export component 108 provides the copy of the reference data 103 from the data repository 102 to a test environment. As mentioned above, the test environment may include the application 112 itself, or may include a virtual service that is configured to simulate the functionality of the application 112. Step 216 may also involve the reference data export component 108 selecting one of a plurality of different versions of the data stored in the data repository 102, and exporting a copy of the reference data 103 of the selected version to the test environment. Step 216 need not be performed if the test environment already contains an accurate and up-to-date copy of the reference data 114.

At step 218, the test data generation component 104 provides the input data 130 that was generated at steps 208, 210 and 212 to the automated test tool 120. The test data generation component 104 also provides the output data 132 that was generated at step 214 to the automated test tool 120.

The automated test tool 120 can then use the input data 130 to generate a plurality of test messages, each containing the input data 134 for a particular test. The automated test tool 120 provides each test message to the test environment. For example, the automated test tool 120 may transmit the test message to the application 112 via a communications network. The automated test tool 120 also receives output data 136 that is generated by the test environment in response to a test message. The automated test tool 120 compares the output data 136 generated by the test environment with the output data 132 generated by the test data generation component 104 to determine whether the application 112 operates in the manner in which it was designed to operate.

To facilitate understanding of the method 200, steps 208 to 214 will now be explained with reference to an example in which an application for logging usage of a multi-user computer system is tested. It should be appreciated that the method and apparatus disclosed herein can be used to test a wide variety of applications and, therefore, the scope of the present disclosure is not limited to testing any particular type of application. A logging application has been chosen for this example simply because it demonstrates the concepts disclosed herein and because it is a type of application that readers can easily envisage. An example of the reference data 114 used by the logging application is shown in Table 1:

TABLE 1

| User ID | Account Type | Unit | Remaining Bandwidth |
|---------|--------------|------|---------------------|
| 101010  | Admin        | Tb   | 100,000.00          |
| 111111  | Normal       | Tb   | 50,000.00           |
| 123456  | Guest        | Gb   | 1,000.00            |
| 222333  | Guest        | Tb   | 10.00               |
| 345678  | Guest        | Mb   | 500.00              |
| 444444  | Guest        | Tb   | 2,000.00            |
| 543210  | Admin        | Gb   | 250,000.00          |

In this example, the reference data 114 has four attributes, "User ID", "Account Type", "Unit" and "Remaining Bandwidth". The values of the User ID attribute are integers that uniquely identify each user account with the multi-user computer system. The Account Type attribute indicates the capabilities (e.g. access privileges) of a user account, and can have one of three allowable values, "Admin", "Normal" and "Guest". The Unit attribute indicates the unit in which an account's bandwidth quota is measured, and can have one of three allowable values, "Mb" (megabyte), "Gb" (gigabyte) and "Tb" (terabyte). The Remaining Bandwidth attribute is a signed fixed point decimal number that indicates the remaining amount of network bandwidth that an account is permitted to use.

The corresponding copy 103 of the reference data 114 that is stored in the data repository 102 is shown in Table 2:

TABLE 2

| User ID | Account Type | Unit |
|---------|--------------|------|
| 101010  | Admin        | Tb   |
| 111111  | Normal       | Tb   |
| 123456  | Guest        | Gb   |
| 222333  | Guest        | Tb   |
| 345678  | Guest        | Mb   |
| 543210  | Admin        | Gb   |

In this example, the copy of the reference data 103 does not comprise all of the attributes and values that are present in the original reference data 114. More specifically, the copy of the reference data 103 does not comprise the Remaining Bandwidth attribute or the record for User ID 444444. The Remaining Bandwidth attribute can be omitted because it is not contained in the input data 134. The record for User ID 444444 can be omitted because it is redundant in view of the record for User ID 222333, which has identical values for its Account Type and Unit attributes. However, it is possible for the copy of the reference data 103 to be a complete copy of the original reference data 114.

An example of the input data 134 for a usage session involving the multi-user computer system is shown in Table 3:

TABLE 3

| User ID | Mode | Unit | Amount | Charge |
|---|---|---|---|---|
| 111111 | VPN | Tb | 250.00 | 0.00 |

In this example, the input data 134 has five attributes, "User ID", "Mode", "Unity", "Amount" and "Charge". Each attribute has a single value. In order for the input data 134 to be valid, the value of the User ID attribute in the input data 134 must be identical to the value of the User ID attribute of a single record in the reference data 114. This is necessary for the input data 134 to have referential integrity with the reference data 114. The Mode attribute indicates the method by which a user accessed the multi-user computer system during a particular session, and can have one of four values, "Web", "Mobile", "VPN" (virtual private network) and "Local". The Unit attribute indicates the unit in which the amount of bandwidth used during the session is measured, and can have one of three values, "Mb" (megabyte), "Gb" (gigabyte) and "Tb" (terabyte). The Amount attribute is an unsigned fixed point decimal number that indicates the amount of bandwidth used during a particular session involving the user account identified by the value of the User ID attribute. The Charge attribute is an unsigned fixed point decimal number that indicates a charge levied for using the multi-user computer system during the session.

A data architect, systems analyst or computer programmer has identified that the Mode and Amount attributes of the input data 134 determine the data processing operations that are performed by the logging application. For example, by analysing the source code of the logging application, it has been identified that each value of the Mode attribute causes a different execution path to be taken. Similarly, it has been identified that different execution paths are taken depending on whether the Amount is in the range of 0 to 500, 501 to 1,000, or over 10,000. It has also been identified that the Account Type attribute of the reference data 114 determines the data processing operations that are performed by the logging application. For example, by analysing the source code of the logging application, it has been identified that each value of the Account Type attribute causes a different execution path to be taken. This knowledge of which attributes, and which attribute values, determine the data processing operation that is performed by the logging application is embodied in the data repository 102. For example, this knowledge may be stored in the form shown in Table 4:

TABLE 4

| Mode | Account Type | Amount |
|---|---|---|
| Web | Admin | 0-500 |
| Mobile | Normal | 501-1,000 |
| VPN | Guest | >1,000 |
| Local | | |

A data architect, systems analyst or computer programmer has also identified which combinations of values of the Mode, Account Type and Amount attributes are valid. The valid combinations of values are stored in the data repository using the Boolean logic illustrated in Table 5:

TABLE 5

(Mode == "Web") AND (Account Type == "Admin") AND
  (Amount == "0-500" OR "501-1,000")
(Mode == "Mobile") AND (Account Type == "Admin") AND
  (Amount == "0-500")
(Mode == "VPN") AND (Account Type == "Admin " OR "Normal")
  AND (Amount == "0-500" OR "501-1,000")
(Mode == "Local ") AND (Unit == *) AND (Amount == *)
  (Amount == "0-500" OR "501-1,000")

In table 5, the symbol "==" is an equality operator, and the symbol "*" is a wildcard operator. For example, the final row of Table 5 indicates that all Unit values and all Amount values are valid when the value of the Mode attribute is equal to "Local".

Optimal test coverage can be achieved by generating a plurality of vectors from the columns of Table 4, calculating the Cartesian product of those vectors to generate a plurality of combinations of values, and disregarding any combinations of values that the Boolean logic of Table 5 indicates to be invalid. The Cartesian product is calculated in the following manner $$\begin{bmatrix} Web \\ Mobile \\ VPN \\ Local \end{bmatrix} \times \begin{bmatrix} Admin \\ Normal \\ Guest \end{bmatrix} \times \begin{bmatrix} 0\text{-}500 \\ 500\text{-}1{,}000 \\ > 1{,}000 \end{bmatrix}$$

After invalid combinations of values have been disregarded, the Cartesian product calculation gives the values for the Mode, Account Type and Amount values that are shown in Table 6:

TABLE 6

| Mode | Account Type | Amount |
|---|---|---|
| Web | Admin | 0-500 |
| Web | Admin | 500-1,000 |
| Mobile | Admin | 0-500 |
| VPN | Admin | 0-500 |
| VPN | Admin | 500-1,000 |
| VPN | Normal | 0-500 |
| VPN | Normal | 500-1,000 |
| Local | Admin | 0-500 |
| Local | Admin | 500-1,000 |
| Local | Admin | >1,000 |
| Local | Normal | 0-500 |
| Local | Normal | 500-1,000 |
| Local | Normal | >1,000 |
| Local | Guest | 0-500 |
| Local | Guest | 500-1,000 |
| Local | Guest | >1,000 |

Table 6 is a tabular representation of the coverage matrix that was described above in connection with step 208. Table 6 thus identifies all of the tests that are to be performed. In order to form a valid set of input data from the values in the coverage matrix, values for the User ID, Unit, Amount and Charge attributes are generated.

Values for the User ID attribute are generated by searching the copy of the reference data 103 that is stored in the data repository 102 to find accounts having attribute values that are equal to the values in the coverage matrix. In this simple example, Account Type is the only attribute that is common to the copy of the reference data and the coverage matrix. Thus, a single record is selected from the copy of the reference data 103 for each of the three possible values of the Account Type attribute. For example, the records whose User ID attributes are 101010, 111111 and 123456 are selected from Table 2, because the values of the Account Type attributes for these records are "Admin", "Normal" and "Guest" respectively.

Values for the Unit attribute are generated by selecting the Unit value that is specified in the copy of the reference data 103 for each of the records that were previously selected. For example, Table 2 indicates that the Unit attribute should have a value of "Tb" for sessions involving User IDs 101010 and 111111. Table 2 also indicates that the Unit attribute should have a value of "Gb" for sessions involving User ID 123456. Selecting the values for the Unit attribute in this manner helps to ensure that the input data has referential integrity, because the values of the User ID and Unit attributes in the input data are equal to those of a particular record in the reference data 114.

The Amount and Charge attributes are not contained in the copy of the reference data 103 (or, indeed, in the original reference data 114). The values of the Amount and Charge attributes are, therefore, generated using the logic 105 that is stored in the data repository 102. In this example, the logic indicates that the value of the Amount attribute is a random number within the range specified in the coverage matrix (i.e. within the range shown in the "Amount" column of Table 6). In this example, the logic also indicates that the value of the Charge attribute is zero if the value of the Account Type attribute for the account associated with the session is "Admin" or "Normal"; otherwise, the value of the Charge attribute is one percent of the value of the Amount attribute. Thus, the value of the Charge attribute is zero for sessions involving User IDs 101010 and 111111, because the value of the Account Type attribute for these accounts is "Admin" and "Normal", respectively. However, the value of the Charge attribute for sessions involving User ID 123456 is one percent of the value of the Amount attribute, because the value of the Account Type attribute for this account is "Guest".

Values for the User ID, Amount and Charge attributes for each test in the coverage matrix are thus generated, to give the example set of input data 130 that is shown in Table 7:

TABLE 7

| User ID | Mode | Unit | Amount | Charge |
|---------|------|------|--------|--------|
| 101010 | Web | Tb | 100.00 | 0.00 |
| 101010 | Web | Tb | 650.00 | 0.00 |
| 101010 | Mobile | Tb | 20.00 | 0.00 |
| 101010 | VPN | Tb | 325.00 | 0.00 |
| 101010 | VPN | Tb | 750.00 | 0.00 |
| 111111 | VPN | Tb | 250.00 | 0.00 |
| 111111 | VPN | Tb | 900.00 | 0.00 |
| 101010 | Local | Tb | 5.00 | 0.00 |
| 101010 | Local | Tb | 550.00 | 0.00 |
| 101010 | Local | Tb | 5,000.00 | 0.00 |
| 111111 | Local | Tb | 450.00 | 0.00 |
| 111111 | Local | Tb | 825.00 | 0.00 |
| 111111 | Local | Tb | 1,500.00 | 0.00 |

TABLE 7-continued

| User ID | Mode | Unit | Amount | Charge |
|---------|------|------|--------|--------|
| 123456 | Local | Gb | 100.00 | 1.00 |
| 123456 | Local | Gb | 500.00 | 5.00 |
| 123456 | Local | Gb | 2,000.00 | 20.00 |

Each row of Table 7 contains valid input data for a test. The input data is valid because: it has referential integrity with the reference data 114 that is stored for use by the application that is to be tested; the values of certain attributes (e.g. the Charge attribute) have been determined using appropriate logic; and it contains only valid combinations of values. Thus, the contents of Table 7 can be provided to the automated test tool 120 as input data 130. The automated test tool 120 can then provide input data 134 for each test to the application 112. The input data 134 causes the application to perform a data processing operation and generate output data 136. An example of the output data 136 for a session logged by the logging application is shown in Table 8:

TABLE 8

| User ID | Session Number |
|---------|----------------|
| 111111 | 000005 |

In this example, the output data 136 has two attributes, "User ID" and "Session Number". Each attribute has a single value. The User ID attribute has an integer value that uniquely identifies which account participated in the session. The Session Number attribute is an integer that uniquely identifies the session.

In order that the automated test tool 120 can determine whether the application is operating correctly, a set of output data corresponding to the input data shown in Table 7 is generated. The values of the User ID and Session Number attributes are generated using logic 105 that is stored in the data repository 102. In this example, the logic indicates that the value of the User ID attribute of the output data 136 is equal to the value of the User ID attribute of the input data 134 for a given session. The logic indicates that the first value of the Session Number attribute is 000000, and that each subsequent value of the Session Number attribute is one greater than the previous value.

Values for the User ID and Session Number attributes for each test in the set of input data 130 shown in Table 7 are thus generated, to give the example set of output data 132 that is shown in Table 9:

TABLE 9

| User ID | Session Number |
|---------|----------------|
| 101010 | 000000 |
| 101010 | 000001 |
| 101010 | 000002 |
| 101010 | 000003 |
| 101010 | 000004 |
| 111111 | 000005 |
| 111111 | 000006 |
| 101010 | 000007 |
| 101010 | 000008 |
| 101010 | 000009 |
| 111111 | 000010 |
| 111111 | 000011 |
| 111111 | 000012 |
| 123456 | 000013 |
| 123456 | 000014 |
| 123456 | 000015 |

Figure 3:
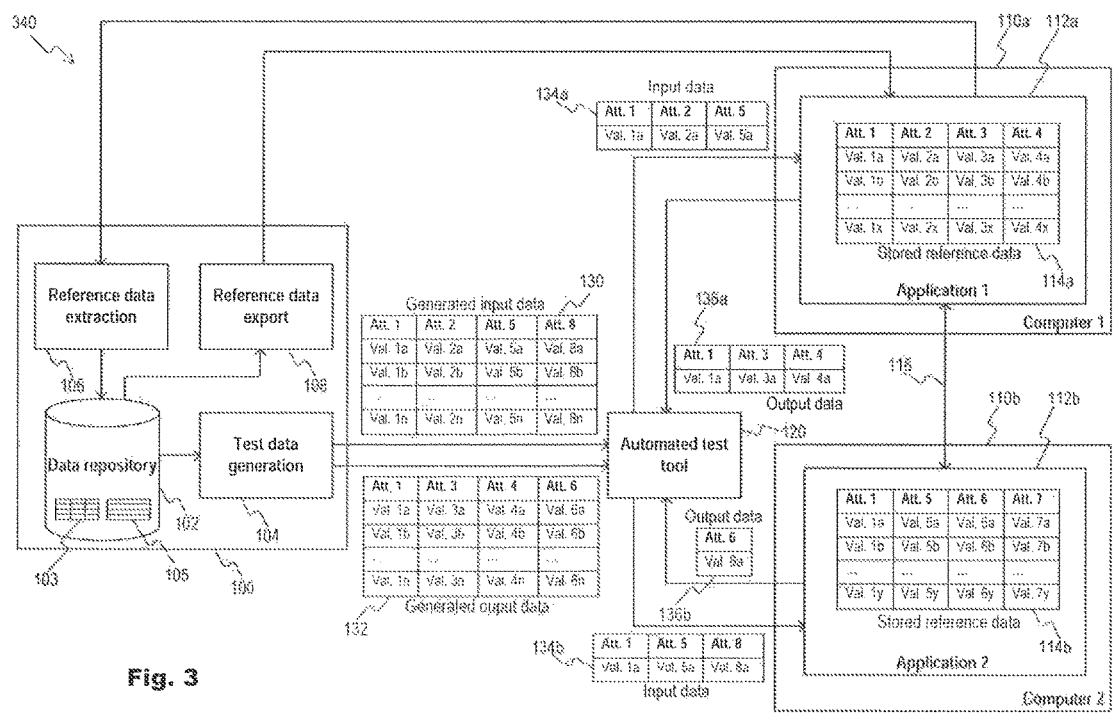
FIG. 3 is a schematic diagram of a computer system configured to test a plurality of applications.

The apparatus 100 can also be used to test a computer system comprising a plurality of applications. FIG. 3 illustrates a computer system 340 that comprises a first computer 110a and a second computer 110b, which execute a first application 112a and a second application 112b respectively. The computer system 340 further comprises an apparatus 100 for use in testing the applications 112a, 112b and an automated test tool 120. The first application 112a is capable of interacting with the second application 112b, by exchanging data via a communications link 116. The first computer 110a, first application 112a, apparatus 100 and automated test tool 120 are substantially the same as the computer 110, application 112, apparatus 100 and automated test tool 120 that were described in connection with FIGS. 1 and 2, so need not be described again. Furthermore, the second application 112b is generally similar to the application 112 that was described in connection with FIGS. 1 and 2, so need not be described in detail.

As shown in FIG. 3, the apparatus 100 is capable of generating input data 130 and output data 136 for use in testing both the first and second applications 112a, 112b. For example, the input data 130 generated by the test data generation component 104 comprises values for attributes (indicated in FIG. 3 as Att. 1, Att. 2 and Att. 5) that are required by the first application 112a. The input data 130 generated by the test data generation component 130 also comprises values for attributes (indicated in FIG. 3 as Att. 1, Att. 5 and Att. 8) that are required by the second application 112b. Similarly, the output data 132 generated by the test data generation component 130 comprises values for attributes (indicated in FIG. 3 as Att. 1. Att. 3 and Att. 4) that are generated by the first application 112a, and values for attributes (indicated in FIG. 3 as Att. 6) that are generated by the second application 112b. The data repository 102 comprises a copy of some or all of the reference data 114a that is stored for use by the first application 112a, and also comprises a copy of some or all of the reference data 114b that is stored for use by the second application 112b. Thus, the apparatus 100 can generate valid data for testing both the first application 112a and the second application 112b, in a similar manner to that already described in connection with FIGS. 1 and 2. It will be appreciated that, whilst FIG. 3 shows just two applications 112a, 112b, the apparatus 100 disclosed herein can be configured for use in testing any number of applications.

The method 200 disclosed herein can be performed by instructions stored on a processor-readable medium. The processor-readable medium may be: a read-only memory (including a PROM, EPROM or EEPROM); random access memory; a flash memory; an electrical, electromagnetic or optical signal; a magnetic, optical or magneto-optical storage medium; one or more registers of a processor; or any other type of processor-readable medium. In alternative embodiments, the present disclosure can be implemented as control logic in hardware, firmware, software or any combination thereof. The apparatus 100 may be implemented by dedicated hardware, such as one or more application-specific integrated circuits (ASICs) or appropriately connected discrete logic gates. A suitable hardware description language can be used to implement the method described herein with dedicated hardware.

It will be understood that the invention has been described above purely by way of example, and that modifications of detail can be made within the scope of the invention.

The invention claimed is:

1. An apparatus for testing an application that processes a set of received input data and a set of stored reference data according to data processing operations, the apparatus comprising:

a memory;
a processor;
a data repository comprising a database hosted on volatile and/or non-volatile storage, the data repository storing
 a copy of some or all of the set of stored reference data and
 a logic defining:
  content of the set of received input data, and
  valid combinations of values for attributes of the set of received input data and the set of stored reference data,
  wherein each of the set of received input data and the set of stored reference data comprises one or more attributes, each of the one or more attributes having at least one value,
 wherein the data repository is configured to:
  designate at least one of the attributes of the set of received input data and set of the stored reference data as being an attribute whose values determine a data processing operation performed by the application when values of the at least one attribute individually or in combination with one or more values of at least one other attribute result in the application performing different processing operations, and
  determine a plurality of values or ranges of the designated at least one attribute that result in the different processing operations being performed by the application; and
a test data generation component comprising instructions stored in the memory which, when executed by the processor, cause the processor to generate a set of input data for testing the application by:
 selecting, from the copy of the set of stored reference data, based upon the determined plurality of values or ranges, values for the designated at least one attribute that result in the application performing the different data processing operations during testing, wherein combinations of values that do not satisfy the stored logic defining the valid combinations of values are disregarded, and
 outputting the selected values in the generated set of input data for testing the application.

2. The apparatus of claim 1, wherein:
the data repository is further configured to store a further logic defining a relationship between a set of output data generated by the application according to the data processing operations and the values of at least one of the one or more attributes of the set of received input data and the one or more attributes of the set of stored reference data processed according to the data processing operations; and
the instructions comprised in the test data generation component, when executed, further cause the processor to use the further logic to generate a set of output data corresponding to the set of input data by:
 generating a value for an attribute of the generated set of output data that satisfies the relationship with reference data in the copy of the set of stored reference data and the generated set of input data, and
 outputting the value for the attribute of the generated set of output data for testing the application.

3. The apparatus of claim 1, wherein the instructions comprised in the test data generation component, when executed, further cause the processor to select the values for the designated at least one attribute by selecting values that cause each of the different data processing operations that can be performed by the application to be performed only once during testing.

4. The apparatus of claim 3, wherein the instructions comprised in the test data generation component, when executed, further cause the processor to select the values for the designated at least one attribute by:
generating a plurality of vectors, each vector comprising a plurality of values for a respective one of the designated at least one attribute, wherein each value of each vector is selected from the determined plurality of values or ranges of values for the respective one of the designated at least one attribute; and
determining a Cartesian product of the plurality of vectors to generate a plurality of combinations of values of the designated at least one attribute.

5. The apparatus of claim 2, wherein the values of the generated set of input data and the generated set of output data are outputted to an automated test tool for testing the application by verifying whether the application generates the generated set of output data when processing the generated set of input data according to the data processing operations.

6. The apparatus of claim 1, wherein:
the copy of the set of stored reference data comprises records, each record comprising a plurality of related values, each value being the value of an attribute of the set of stored reference data; and
selecting the values comprises selecting a plurality of records from the copy of the set of stored reference data, wherein the selected plurality of records comprise a selected plurality of related values for the designated at least one attribute.

7. The apparatus of claim 1, wherein:
the data repository is further configured to store a further logic defining a value of an attribute of the set of input data that is not contained in the copy of the set of stored reference data; and
the instructions comprised in the test data generation component, when executed, further cause the processor to:
use the stored further logic to generate the value for the attribute of the set of received input data that is not contained in the copy of the set of stored reference data, and
output the generated value in the generated set of input data.

8. The apparatus of claim 1, wherein:
the data repository is further configured to store a further logic defining a relationship between a set of output data generated by the application according to a data processing operation and the values of at least one of the one or more attributes of the set of stored reference data and the one or more attributes of the set of received input data processed according to the data processing operation, the set of output data comprising one or more attributes each having at least one value; and
the instructions comprised in the test data generation component, when executed, further cause the processor to use the stored further logic to generate the set of output data by:
generating a value for an attribute of the generated set of output data that satisfies the relationship with of output data in the copy of the set of stored reference data and the generated set of input data, and
outputting the value for the attribute of the generated set of output data for testing the application.

9. The apparatus of claim 1, further comprising a reference data extraction component comprising instructions stored in the memory which, when executed by the processor, cause the processor to:
select a subset of the set of stored reference data used by the application;
extract the selected subset from the set of stored reference data used by the application; and
store the extracted subset in the data repository.

10. The apparatus of claim 1, further comprising a reference data export component comprising instructions stored in the memory which, when executed by the processor, cause the processor to export the copy of the set of stored reference data from the data repository to a test environment for testing the application.

11. The apparatus of claim 1, wherein:
the data repository is configured to store a plurality of versions, each version comprising a copy of some or all of the set of stored reference data at a respective time; and
the instructions comprised in the test data generation component, when executed, further cause the processor to
select a version stored in the data repository, and
generate at least one of a set of generated input data and a set of generated output data corresponding to the selected version.

12. The apparatus of claim 11, further comprising a reference data export component comprising instructions stored in the memory which, when executed by the processor, cause the processor to export the selected version to a test environment for testing the application.

13. The apparatus of claim 10, wherein the test environment comprises a virtual service configured to simulate a functionality of the application.

14. The apparatus of claim 1,
wherein the instruction comprised in the test data generation component, when executed, further cause the processor to generate an additional set of input data for testing at least one additional application that processes at least one additional set of received input data and at least one additional set of stored reference data according to at least one additional data processing operation,
wherein the data repository is configured to store a copy of some or all of the at least one additional set of stored reference data for the at least one additional application; and
wherein the instructions comprised in the test data generation component, when executed, further cause the processor to generate the additional set of input data for use in testing the at least one additional application by
selecting at least one additional application value from the copy of some or all of the at least one additional set of stored reference data, and
outputting the selected additional application value in the generated additional set of input data for testing the at least one additional application.

15. A computer-implemented method for testing an application that processes a set of received input data and a set of stored reference data according to data processing operations, each of the set of received input data and the set of stored reference data comprising one or more attributes, each of the one or more attributes having at least one value, the method performed by a processor when executing a set of instructions stored in a memory, the method comprising:

loading, into a data repository comprising a database hosted on volatile and/or non-volatile storage, a logic, defining content of the set of received input data and valid combinations of values for attributes of the set of received input data, and the set of stored reference data, the data repository storing a copy of some or all of the set of stored reference data;

designating, in the data repository, at least one of the attributes of the set of received input data and set of the stored reference data as being an attribute whose values determine a data processing operation performed by the application, when values of the at least one attribute individually or in combination with one or more values of at least one other attribute result in the application performing different processing operations;

determining, a plurality of values or ranges of the designated at least one attribute that result in the different processing operations being performed by the application; and generating a set of input data for testing the application by:
selecting, from the copy of some or all of the set of stored reference data, based upon the determined plurality of values or ranges, values for the designated at least one attribute that result in the application performing the different data processing operations during testing, wherein selecting the values comprises disregarding combinations of values that do not satisfy the logic defining the valid combinations of values; and
outputting the selected values in the generated set of input data for testing the application.

16. The method of claim 15, further comprising:
loading a further logic defining a relationship between a set of output data generated by the application according to the data processing operations and the values of at least one of the one or more attributes of the set of received input data and the one or more attributes of the set of stored reference data processed according to the data processing operations; and
using the further logic to generate a set of output data corresponding to the set of input data by:
generating a value for an attribute of the generated set of output data that satisfies the relationship with reference data in the copy of the set of stored reference data and the generated set of input data, and
outputting the value for the attribute of the generated set of output data for testing the application.

17. The method of claim 15, wherein selecting the values for the designated at least one attribute comprises selecting values that cause each of the different data processing operations that can be performed by the application to be performed only once during testing.

18. The method of claim 17, wherein selecting the values for the designated at least one attribute comprises:
generating a plurality of vectors, each vector comprising a plurality of values for a respective one of the designated at least one attribute, wherein each value of each vector is selected from the determined plurality of values or ranges of values for the respective one of the designated at least one attribute; and
determining a Cartesian product of the plurality of vectors to generate a plurality of combinations of values of the designated at least one attribute.

19. The method of claim 16, wherein the values of the generated set of input data and the generated set of output data are outputted to an automated test tool for testing the application by verifying whether the application generates the generated set of output data when processing the generated set of input data according to the data processing operations.

20. The method of claim 15,
wherein the copy of the set of stored reference data comprises records, each record comprising a plurality of related values, each value being the value of an attribute of the set of stored reference data, and
wherein generating the set of input data further comprises:
selecting a plurality of records from the copy of the set of stored reference data, wherein the selected plurality of records comprise a selected plurality of related values for the designated at least one attribute, and
outputting the selected plurality of related values from the selected plurality of records in the generated set of input data for testing the application.

21. The method of claim 15, further comprising:
loading stored logic that defines a value of an attribute of the set of input data that is not contained in the copy of the set of stored reference data;
using the stored logic to generate the value for the attribute of the set of input data that is not contained in the copy of the set of stored reference data, and
outputting the generated value in the generated set of input data for testing the application.

22. The method of claim 15, further comprising:
loading stored logic that defines a relationship between a set of output data generated by the application according to a data processing operation and the values of at least one of the one or more attributes of the set of stored reference data and the one or more attributes of the set of received input data processed according to the data processing operation, the set of output data comprising one or more attributes each having at least one value; and
using the stored logic to generate a set of output data by:
generating a value for an attribute of the generated set of output data that satisfies the relationship with reference data in the copy of the set of stored reference data and the generated set of input data, and
outputting the value for the attribute of the generated set of output data for testing the application.

23. The method of claim 15, further comprising:
selecting a subset of the set of stored reference data used by the application;
extracting the selected subset from the set of stored reference data used by the application; and
storing the extracted subset in the data repository.

24. The method of claim 15, further comprising exporting the copy of the set of stored reference data from the data repository to a test environment for testing the application.

25. The method of claim 15, wherein the data repository stores a plurality of versions, each version comprising a copy of some or all of the set of stored reference data at a respective time, the method further comprising:
selecting a version stored in the data repository; and
generating at least one of a set of generated input data and a set of generated output data corresponding to the selected version.

26. The method of claim 25, further comprising exporting the selected version to a test environment for testing the application.

27. The method of claim 24, wherein the test environment comprises a virtual service to simulate a functionality of the application.

28. The method of claim 15, further comprising:
generating an additional set of input data for testing at least one additional application that processes at least one additional set of received input data and at least one additional set of stored reference data according to at least one additional data processing operation, the generating including:
- selecting at least one additional application value from a copy of some or all of at least one additional set of stored reference data for the at least one additional application stored in the data repository; and
- outputting the selected at least one additional application value in the generated additional set of input data for testing the at least one additional application.

29. A non-transitory computer readable medium containing instructions which, when executed by at least one processor, cause the at least one processor to perform operations for testing an application that processes a set of receive input data and a set of stored reference data according to data processing operations, each of the set of received input data and the set of stored reference data comprising one or more attributes, each of the one or more attributes having at least one value, the operations comprising:
loading, into a data repository comprising a database hosted on volatile and/or non-volatile storage, a logic defining content of the set of received input data and valid combinations of values for attributes of the set of received input data and the set of stored reference data, the data storing a copy of some or all of the set of stored reference data;

designating, in the data repository, at least one of the attributes of the set of received input data and set of the stored reference data as being an attribute whose values determine a data processing operation performed by the application, when values of the at least one attribute individually or in combination with one or more values of at least one other attribute result in the application performing different processing operations;

determining, a plurality of values or ranges of the designated at least one attribute that result in the different processing operations being performed by the application; and generating a set of input data for testing the application by:
- selecting from the copy of some or all of the set of stored reference data, based upon the determined plurality of values or ranges, values for the designated at least one attribute that result in the application performing the different data processing operations during testing, wherein selecting the values comprises disregarding combinations of values that do not satisfy the stored logic defining the valid combinations of values; and
- outputting the selected values in the generated set of input data for testing the application.

* * * * *